United States Patent [19]

Fournier

[11] 3,879,746

[45] Apr. 22, 1975

[54] GATE METALLIZATION STRUCTURE

[75] Inventor: Paul Richard Fournier, Allentown, Pa.

[73] Assignee: Bell Telephone Laboratories, Incorporated, Murray Hill, Berkeley Heights, N.J.

[22] Filed: Dec. 17, 1973

[21] Appl. No.: 425,504

Related U.S. Application Data

[62] Division of Ser. No. 258,072, May 30, 1972, Pat. No. 3,798,145.

[52] U.S. Cl. ........................ 357/71; 357/23; 357/54

[51] Int. Cl. ............................................. H01l 5/00

[58] Field of Search .......................... 357/54, 71, 23

[56] References Cited

UNITED STATES PATENTS

| | | | |
|---|---|---|---|
| 3,642,548 | 2/1972 | Eger | 357/71 |

*Primary Examiner*—Michael J. Lynch
*Assistant Examiner*—E. Wojciechowicz
*Attorney, Agent, or Firm*—E. M. Fink

[57] ABSTRACT

A technique for reducing the interdiffusion rates and inhibiting intermetallic compound formation between thin film titanium-platinum metallizations involves incorporating a titanium nitride layer intermediate the titanium and platinum.

1 Claim, 3 Drawing Figures

GATE METALLIZATION STRUCTURE

This is a division, of application Ser. No. 258,072, filed May 30, 1972 now U.S. Pat. No. 3,798,145.

This invention relates to a technique for reducing the interdiffusion rate and inhibiting compound formation between thin film conductive components. More particularly, the present invention relates to a technique for inhibiting intermetallic compound formation and retarding grain boundary diffusion in titanium-platinum thin film metallizations.

DESCRIPTION OF THE PRIOR ART

In recent years, miniaturization of components and circuitry coupled with the increasing complexity of modern electronic systems have created an unprecedented demand for reliability in thin film circuitry and the need for the total exploitation of the technology. This is particularly true in the case of thin film metallization and lead attachment which have long been recognized as being critical factors in the stability of circuit characterisitics.

Early workers in the art recognized that the metallurgical compatibility of the metallic constituents of the joining and conducting system played a prominent role in determining the parameters of interest, so motivating the use of a single metal for this purpose. Although such systems were found to be ideal from a metallurgical standpoint, they suffered from inherent difficulties in that the manufacturer was necessarily restricted from the standpoint of obtaining optimum circuit characteristics. Accordingly, workers in the art have focused their interest upon multi-metal joining or conducting systems.

The most commonly used metallization system in beam lead integrated circuits is a composite of titanium and platinum. Unfortunately, it has been found that diffusion or the migration of platinum into titanium and, to a lesser extent, titanium into platinum through grain boundaries and down dislocation cores, drastically alters device characteristics during life performance. Additionally, the formation of titanium-platinum intermetallic compounds at the interface of the metals creates serious impediments to effecting etching. Still further, the deposition of titanium-platinum metallizations on double dielectric ($siO_2$-$Al_2O_3$) IGFET integrated circuits results in radiation damage to the insulating system which can only be cured by thermal annealing, such annealing creating problems of compatibility with standard processing techniques. Accordingly, workers in the art have long sought to develop a technique which would avoid the formation of conductive intermetallic compounds and reduce diffusion rates in titanium-platinum thin film metallizations.

SUMMARY OF THE INVENTION

In accordance with the present invention, the prior art difficulties encountered in connection with such thin film metallizations have been significantly lessened by a novel technique. Briefly, the inventive technique involves depositing, typically by reactive sputtering, a thin film of titanium upon a suitable substrate, followed by a thin film of titanium nitride, and a layer of platinum. Studies have revealed that the titanium nitride layer deposited between the titanium and platinum layers inhibits intermetallic compound formation and interdiffusion between platinum and titanium and in the noted IGFET structures the titanium nitride layer deposited between the dielectric and titanium reduces the radiation damage induced therein during deposition.

BRIEF DESCRIPTION OF THE DRAWING

The invention will be more readily understood by reference to the following detailed description, taken in conjunction with the accompanying drawing, wherein.

DETAILED DESCRIPTION

Figure 1:
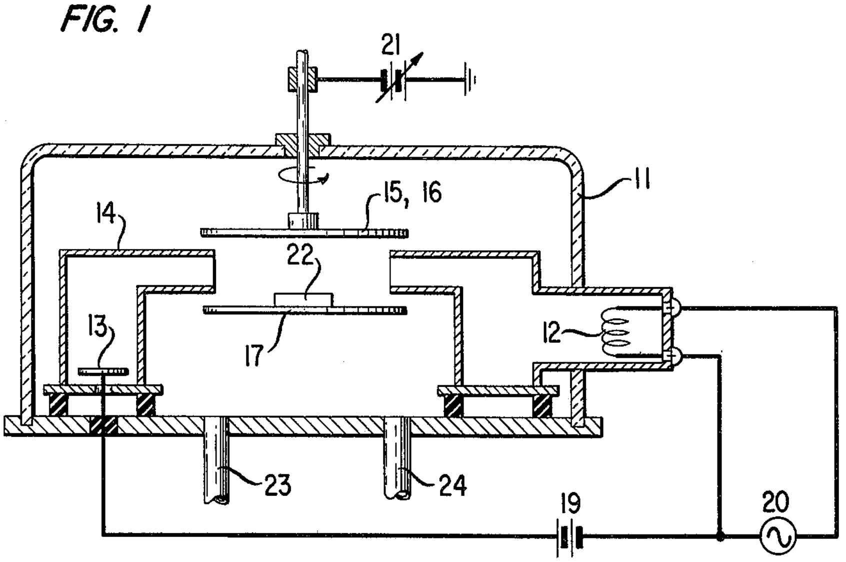
FIG. 1 is a front elevational view in cross section of an apparatus suitable for use in preparing the thin film metallization of the invention.

With reference now more particularly to FIG. 1, there is shown a typical triode sputtering apparatus suitable for depositing titanium and platinum films by cathodic sputtering. Shown in the figure is a vacuum chamber 11 which contains a heated tantalum filament 12 and anode 13 enclosed in a plasma confinement tube 14. Sputtering targets 15 and 16 and pedestal 17 are located, respectively, above and below openings in the confinement tube 14. A confined argon plasma is maintained by applying a source of electrical potential 19 between anode 13 and filament 12. Filament 12 is heated by electrical source 20 and supplies thermionically generated electrons with which to support the argon plasma.

A source of electrical potential 21 is shown connectd between targets 15 and 16 and ground. Pedestal 17 is employed as a positioning support for substrate 22 upon which the sputtered film is to be deposited. Conduits 23 and 24 are provided for introducing and removing nitrogen and inert gases to and from the system, respectively.

The present invention may conveniently be described in detail by reference to an illustrative example in which titanium and platinum are employed as cathodes 15 and 16 in the apparatus shown in FIG. 1. The substrates selected for use herein may conveniently be silicon or germanium semiconductor materials, glass, glazed ceramics, a double dielectric $SiO_2$-$Al_2O_3$ IGFET integrated circuit, etc.

In the operation of the process, substrate 22 is initially placed upon platform 17 as shown in FIG. 1. Vacuum chamber 11 is next evacuated and argon admitted thereto. The extent of the vacuum employed in the operation of the described process is dependent upon consideration of several factors. Increasing the inert gas pressure and thereby reducing the vacuum within chamber 11 decreases the rate at which the material being sputtered is removed from the cathode and thus decreases the rate of deposition. The minimum pressure is usually dictated by plasma instabilities. A practical lower limit in this respect is $5 \times 10^{-4}$ torr., although it may be varied depending upon filament 12 electron emission, sputtering rate, etc. The minimum useful pressure is that at which the sputtering can be reasonably controlled within the prescribed tolerances. It follows from the discussion above that the maximum pressure is determined by the lowest deposition rate which can be economically tolerated. After the requisite pressure is obtained, cathode 15 or 16 is made electrically negative with respect to ground dependent upon which material is being sputtered.

The practical minimum voltage necessary to produce sputtering is about −65 volts. Increasing the negative potential of the targets increases the rate of deposition. Accordingly, the maximum voltage is dictated by considerations of construction geometry and of the same factors controlling the minimum pressure.

The balancing of these various factors of voltage, pressure and relative positions of the target, anode, filament, and substrate to obtain a high quality deposit is well known in the sputtering art.

With reference now more particularly to the example under discussion, by employing a proper voltage, pressure and spacing of the various elements within the vacuum chamber, a layer of titanium is deposited, sputtering being conducted for a period of time calculated to produce the desired thickness. For the purposes of the present invention, the minimum thickness of the titanium layer deposited upon the substrate is approximately 1,000 A. There is no maximum limit on the thickness, although little advantage is gained by an increase beyond 2,000 A.

Following deposition of the titanium layer, nitrogen is admitted to the system in an amount sufficient to yield a nitrogen partial pressure ranging from $5 \times 10^{-5}$ millimeters of mercury to $6 \times 10^{-5}$ millimeters of mercury and reactive sputtering of titanium effected, thereby resulting in the deposition of a titanium nitride layer. The thickness of this layer ranges from 100 to 200 A, such thickness being dictated by considerations relating to the degree of effectiveness in reducing metal migration and intermetallic compound formation.

Next, the nitrogen flow is terminated and a layer of platinum ranging in thickness from 2,000 to 3,000 A is deposited upon the titanium nitride.

When utilizing the double dielectric $SiO_2$-$Al_2O_3$-silicon substrate members utilized in the fabrication of IGFET structures a titanium nitride layer having a thickness within the noted range is deposited upon the substrate prior to the deposition of the titanium film to insure against excessive residual ultraviolet radiation damage to the dielectric arising from the argon plasma discharge.

Figure 2:
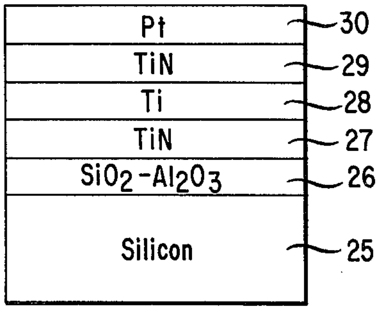
FIG. 2 is a front elevational view of a typical substrate member having deposited thereon a thin film of a titanium-platinum metallization in accordance with the present invention.

With reference now to FIG. 2, there is shown a front elevational view in cross section of a typical structure prepared in accordance with the foregoing technique. Shown in the figure is a silicon substrate member 25 bearing a double dielectric coating of $SiO_2$-$Al_2O_3$ 26, a layer of titanium nitride 27, a layer of titanium 28, a second layer of titanium nitride 29 and a layer of platinum 30.

Figure 3:
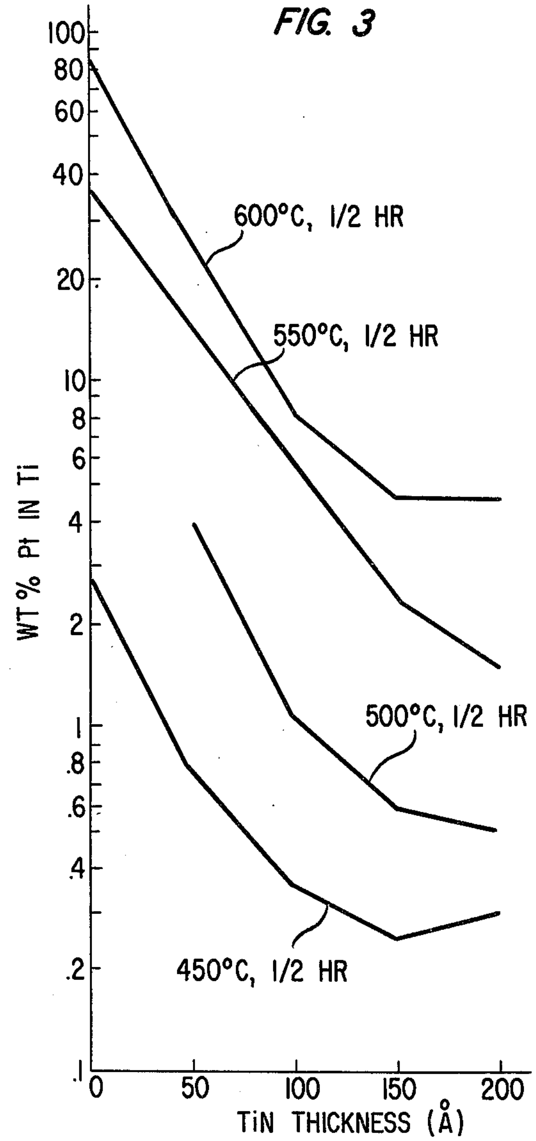
FIG. 3 is a graphical representation on coordinates of titanium nitride thickness in A against weight per cent platinum in titanium showing interdiffusion and intermetallic compound formation at various temperatures for the described thicknesses.

To evaluate the efficacy of the described technique, samples of titanium-titanium nitride and platinum were sputter deposited as described upon a silicon substrate, the titanium nitride thickness being varied from 0 to 200 A in increments of 50 A. The titanium and platinum layers were maintained at 1,000 and 2,000 A, respectively. The samples were then sectioned and heated for 30 minuutes at temperatures of 450°, 500°, 550° and 600° C in nitrogen. The platinum was removed by back sputtering and the remaining titanium layers were electron microprobed for residual platinum. The results are shown graphically in FIG. 3 on coordinates of titanium nitride thickness in A against platinum content in the titanium layer in weight per cent. It is evident by analysis of the graphical data that the presence of a titanium nitride layer having a thickness of at least 100 A significantly reduces or inhibits the diffusion of platinum into titanium and/or intermetallic compound formation.

In order to determine the relationship between the amount of residual platinum in titanium which leads to the formation of unetchable conductive films, each of the samples described was then etched for the purpose of removing the titanium and the surfaces then probed and measured for conductivity utilizing an electrometer with a sensitivity of approximately $10^{-12}$ amperes. In each case, conductive films were found on those samples having residual platinum present in amounts greater than 0.6 weight per cent. With reference again to FIG. 3, it logically follows that a structure containing 100 A of titanium nitride between the titanium and the platinum is capable of withstanding heat treatments of at least 450° C (a temperature to which prior art structures were subjected unsuccessfully in a thermal annealing step) for 30 minutes while inhibiting the formation of the deleterious intermetallic compounds and the diffusion of platinum into titanium.

Next, a statistical study was made to confirm the absence of conductive films in structures including the novel titanium nitride layer. Twenty thermally oxidized silicon silices were metallized with 1,000 A of titanium, 100 A of titanium nitride, 2,000 A of platinum and 10,000 A of gold and metallization test patterns defined by back sputtering. On 10 slices, a modified metallization pattern from a 512 bit IGFET shift register was used. In a chip size of 120 mils per side, the pattern comprised a serpentine line approximately 5 cm in length interdigitated with 21 interconnecting lines, the line widths and spacing being nominally 10 microns. 385 chips were measured and no conductive films were observed.

The incorporation of a titanium nitride layer approximately 100 A in thickness, between the titanium and the aluminum oxide in an IGFET circuit comprising a silicon substrate bearing a double dielectric $SiO_2$-$Al_2O_3$ layer was next studied. Analysis revealed that the residual radiation damage was less than when the titanium was sputter deposited directly onto the aluminum oxide. More specifically, the flat band voltage obtained with the sputter deposited titanium nitride is approximately 0.25 volts more negative than that obtained with a filament evaporated titanium electrode, whereas for a sputter deposited titanium electrode, the flat band voltage was typically 1 volt more negative. Furthermore, the novel structure, when annealed in forming gas at 325° C for 16 hours, evidences a flat band voltage characteristic of that obtained with filament evaporated titanium.

What is claimed is:

1. A gate metallization structure for an insulated gate field effect transistor which comprises a substrate of silicon having a first dielectric layer of silicon dioxide formed on a surface of the substrate, a second dielectric layer of aluminum oxide formed on the surface of the first dielectric layer, and a metal pattern formed on the surface of the aluminum oxide layer, characterized in that said metal pattern comprises seccessively titanium nitride, titanium, titanium nitride and platinum.

* * * * *